May 27, 1952  W. W. HANSEN  2,597,867
HIGH-FREQUENCY ATTENUATING DEVICE
Original Filed July 25, 1942  2 SHEETS—SHEET 1
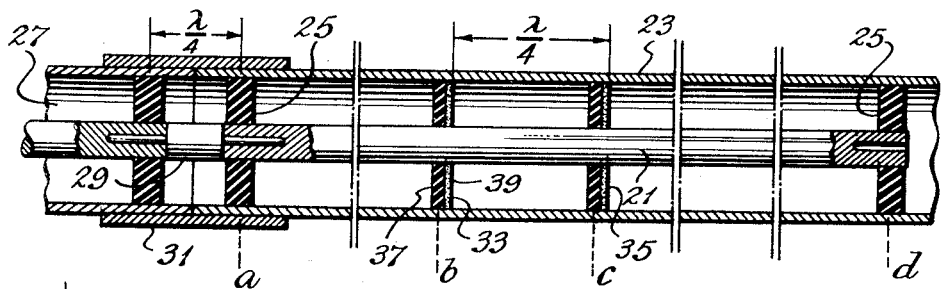
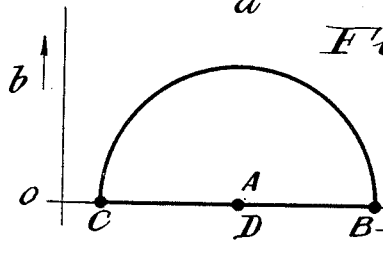 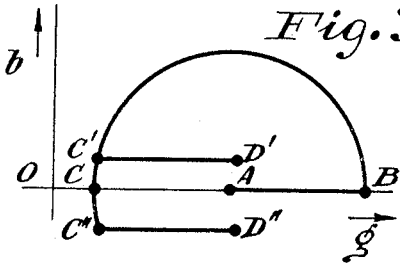
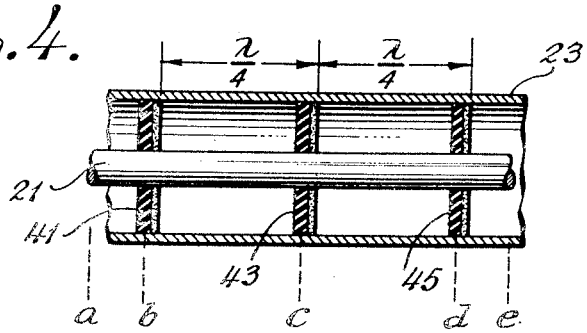
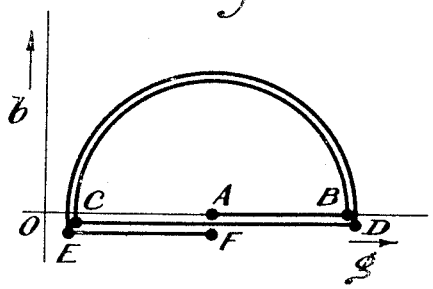 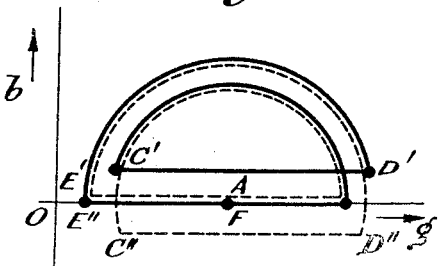
INVENTOR.
WILLIAM W. HANSEN,
DECEASED
BY BETSY R. HANSEN,
EXECUTRIX
ATTORNEY May 27, 1952  W. W. HANSEN  2,597,867
HIGH-FREQUENCY ATTENUATING DEVICE
Original Filed July 25, 1942  2 SHEETS—SHEET 2

INVENTOR.
WILLIAM W. HANSEN,
DECEASED
BY BETSY R. HANSEN
EXECUTRIX

ATTORNEY

Patented May 27, 1952

2,597,867

UNITED STATES PATENT OFFICE 2,597,867

HIGH-FREQUENCY ATTENUATING DEVICE

William W. Hansen, deceased, late of Stanford University, Calif., by Betsy R. Hansen, executrix, Stanford University, Calif., assignor to The Sperry Corporation, a corporation of Delaware Original application July 25, 1942, Serial No. 452,319. Divided and this application August 17, 1949, Serial No. 110,738

12 Claims. (Cl. 178—44)

The present invention relates to devices for attenuating high frequency electromagnetic energy in ultra high frequency transmission line systems and especially to devices adapted for use in transmission line systems.

The present case is a division of prior copending application Serial No. 452,319 for "High Frequency Attenuating Device" filed July 25, 1942 in my name, now Patent No. 2,514,544 granted July 11, 1950.

In many high frequency systems it is necessary or desirable to attenuate the energy derived from an ultra high frequency source by a predetermined amount. Usually such high frequency systems utilize concentric transmission lines or wave guides for the transmission of energy between various parts of the system. It is therefore desirable to provide similar types of apparatus for effecting the desired attenuation.

Special provision must also be made to suitably match the attenuating device to the rest of the system in order not to produce undesired wave reflections and standing waves, resulting in well known harmful effects.

In addition, it is desirable to provide attenuating devices which will offer impedances substantially the same as the characteristic impedances of the concentric transmission lines or wave guides to which they are connected, when seen from either end, whereby the device may be connected in either sense to its source and its load without impedance mismatch.

It is also desirable to provide adjustability for such attenuators, whereby they may be varied to satisfy the requirements of the particular use. Furthermore, it is necessary to design such devices to be of fixed length, whereby they may be permanently incorporated in the system wherein they are used.

Accordingly, it is an object of the present invention to provide improved high frequency attenuating devices incorporating special provisions for eliminating wave reflections and for matching the impedance of the attenuator to the impedances of the other devices connected thereto.

It is another object to provide improved high frequency attenuating devices which are relatively insensitive to small changes in frequency.

It is another object to provide improved attenuating devices in which the amounts of attenuation produced may be suitably adjusted, preferably in a linear fashion.

It is another object to provide improved attenuating devices which may be connected directly to concentric line utilization or source devices.

A further object is to provide improved attenuating devices which have a uniform outer conductor and separate sections of inner conductor of predetermined electrical lengths and of predetermined power absorption capabilities cooperating to afford bilaterally matched attenuator devices.

A further object is to provide improved attenuating devices having an uniform outer conductor and an uniform inner conductor supported by dissipative elements of predetermined power absorption capabilities, wherein the dissipative elements are spaced along the inner conductor to define sections thereof of predetermined electrical lengths; and the dissipative elements and inner and outer conductors cooperate to afford bilaterally matched attenuator devices.

A further object is to provide improved attenuating devices which involves the insertion at predetermined electrical lengths apart, of a plurality of dissipative elements of predetermined power absorption capacities along a portion of an inner conductor of a conventional coaxial transmission line, wherein the dissipative elements and the inner and outer conductors of the coaxial transmission line cooperate to afford bilaterally matched attenuator devices.

Other objects and advantages will become apparent from the specification, taken in connection with the accompanying drawings wherein the invention is embodied in concrete form.

In the drawings,

Fig. 1 shows a longitudinal cross-sectional view of one form of attenuating device useful especially where a fixed small value of attenuation is desired.

Figs. 2 and 3 represent admittance diagrams useful in explaining the theory of operation of the device of Fig. 1.

Fig. 4 shows a similar view of a modification of the device of Fig. 1 which is relatively insensitive to frequency changes.

Figs. 5 and 6 are admittance diagrams useful in explaining the theory of operation of the device of Fig. 4.

Figure 7:
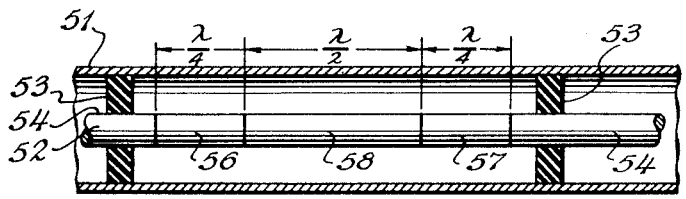
Fig. 7 shows a longitudinal cross-sectional view of another type of fixed concentric-line attenuator.

Referring to the drawings,

Fig. 1 shows one type of ultra high frequency attenuator or energy dissipator which may be used to decrease high frequency power to a desired value. The device of Fig. 1 comprises a section of concentric transmission line having inner conductor 21 and outer conductor 23. These conductors are held in fixed concentric relation by insulating supports or spacers 25. Line 21, 23 is adapted to be joined at either end to other lines, such as line 27, and for this purpose, the insulating supports 25 are so positioned that when the two concentric transmission lines are abutted as shown, the insulators are spaced by a distance electrically equivalent to one-quarter-wavelength of the operating frequency in free space, whereby disturbing reflections due to dielectric and metallic discontinuities are substantially eliminated. In order not to damage the structure during handling, the inner conductor 21 is made to terminate slightly within outer conductor 23. The inner conductors of the two joined lines may be smoothly joined by a suitable joining member 29, as here shown, and as more fully described in Fig. 1C of my copending application Serial No. 422,716 for "Concentric Line Measuring Device" filed December 12, 1941, now Patent No. 2,404,797 granted July 30, 1946. An outer sleeve 31 is used to suitably join and connect the abutting outer conductors.

To dissipate and attenuate the energy appearing in line section 21, 23, suitable dissipating resistance elements 33, 35 are used, being shown as two in number in Fig. 1. A suitable form for these resistances has been found to comprise an insulating disc 37 on which is placed a thin coating 39 of resistive material, such as carbon or some semi-conductor, although it is to be noted that my invention is not restricted to this form of dissipating resistance, since many other forms may be used.

So far as dissipation of energy is concerned, only one such dissipator 33, having the proper resistance, need be used. However, such a dissipator would cause serious impedance changes and wave reflections in the measuring apparatus. Thus, let it be supposed that line 21, 23 has a characteristic admittance $Y_0$ and is matched to line 27 of the same characteristic admittance. Then, at point $a$, the admittance looking toward the left in Fig. 1 will be $Y_0$. This is shown at point A of the admittance diagram of Fig. 2. This admittance remains the same as the inspection point moves to the right, until point $b$ is reached, at which the dissipator is located. At this point there is added the admittance of the dissipator, changing the total admittance to that of point B of the admittance diagram. With only one dissipator used, the admittance for any point to the right of $b$ will depend on the distance of this point from point $b$, the variation for the first quarter-wavelength of the operating frequency being along semicircle B—C. This semicircle forms a constant coordinate circle of a bipolar coordinate system having $Y_0$ and $-Y_0$ as poles thereof. For greater distances, the admittance locus traverses and retraverses a complete circle. For small attenuation values, the center of this circle is approximately at A.

This variation of admittance with distance is very troublesome, especially when other devices are to be adjoined, since it leads to impedance mismatch and to an asymmetric device whose sense of connection in the circuit becomes important. In addition, troublesome reflections occur, causing standing waves and inefficient transmission. To avoid this, a second dissipator 35 is added, spaced one-quarter-wavelength from the first dissipator 33 and having substantially the same resistance (and hence the same admittance) for low values of this admittance. Then the admittance seen to the left between $b$ and $c$ varies along semicircle B—C as the inspection point travels between $b$ and $c$. The admittance of dissipator 35 causes the resultant leftward admittance at point $c$ to become as at A. Since this is the same as the characteristic admittance $Y_0$, the dissipator line section is fully matched to the line, and no variation of admittance occurs along the line to the right of $c$. Also, the quarter-wave distance $b$—$c$ causes the reflected wave at $c$ to substantially cancel that at $b$, resulting in more efficient transmission and minimum standing waves.

The above device is useful where small values of attenuation are desired. For attenuations where the admittance of the shunt dissipating elements becomes appreciable compared to the line characteristic admittance, the two dissipators should not have equal values, but their admittances should be related by the equation $$Y_2 = \frac{Y_1}{1+\frac{Y_1}{Y_0}}$$

where $Y_1$ is the admittance of element 37 and $Y_2$ that of element 35.

The system just described is quite satisfactory for a fixed frequency, but rapidly decreases in efficiency as the frequency changes. Also, the device is no longer symmetrical for large attenuation values, and exhibits different impedances depending on which end is connected to the circuit to be matched, and depending on the spacing of the dissipators from the end of the device.

Thus, referring to Fig. 3, if the operating frequency decreases slightly, admittance A at $a$ changes to B at $b$. Between $b$ and $c$ the admittance varies along semicircle B—C. However, since the frequency has decreased, the distance formerly one-quarter-wavelength of the former frequency is now less than one-quarter-wavelength at the present frequency, so that at point $c$ there exists an admittance C'. Adding the admittance of dissipator 35 carries the resultant admittance to D', which no longer matches the characteristic admittance $Y_0$, resulting in some of the deleterious effects discussed above.

Similarly, if the operating frequency increases, the resultant admittance at $c$ becomes D'', and also varies between $c$ and $d$.

In order to improve the operation with small frequency deviations, the device of Fig. 4 may be used. Here three dissipators 41, 43, 45 are used, the admittances of the outer ones 41, 45 being substantially half that of the central dissipator 43, (for small attenuations) and all being equally spaced at quarter-wave intervals.

Referring to Fig. 5, the admittance at $a$ will be the characteristic admittance $Y_0$, as at A. As the observation point moves to the right, the admittance seen remains constant, until at $b$ the admittance of dissipator 41 is added, changing the observed admittance to B. Between $b$ and $c$ the admittance locus will traverse semicircle B—C. At c the double admittance of dissipator 43 is added, resulting in admittance D, which is substantially identical with B. Between c and d the admittance locus will traverse semicircle D—E, coincident with B—C. At d the admittance of dissipator 45 is added, resulting in admittance F, which is coincident with A and has the value $Y_0$, the characteristic admittance. Hence perfect matching is effected, as in Fig. 2. The slight displacements of points B and D, C and E and A and F, and semicircles BC and DE, in Fig. 5, are for purpose of rendering the description clear, it being understood that the respective pairs of points and the pair of semicircles are, in fact, coincident.

Now if the operating frequency decreases, semicircle B—C is not completed, the locus being B—C' in Fig. 6. The addition of admittance at c carries the diagram to D', and traversing c—d carries the locus along D'—E', so that the addition of the admittance of 45 results in F again, as before. Hence a slight frequency decrease does not substantially affect the matching, since it results again in the characteristic admittance $Y_0$. In the same way it will be clear that a frequency increase will cause the locus to become A'—B—C''—D''—E'' (coincident with E')—F, again yielding a good match.

For large attenuation values, requiring large admittance values for dissipators 41, 43, 45, the admittance $Y_3$ of the center dissipator 43 should be related to the admittance $Y_4$ of dissipators 41, 45 (which are equal) by the equation.

$$Y_3 = \frac{2Y_4}{1 - \frac{Y_4^2}{Y_0}}$$

It will be noted that for small values of $Y_4$ relative to $Y_0$, $Y_3$ is substantially twice $Y_4$, as described above.

It will also be noted that the present device is fully symmetrical, and will present the same impedance when viewed from either end, rendering it more suitable for practical use.

The response for varying frequency may be still more improved by adding more dissipators, still spaced by a quarter-wavelength, with their admittances proportional to the coefficients obtained in a binomial expansion wherein the exponent of the expansion is equal to the number of dissipators less one; that is, the admittance (or resistance) values of the successive quarter wave spaced dissipators will have the following ratios of admittance:

| No. of dissipators | Admittances |
| --- | --- |
| 2 | 1—1 (Fig. 1). |
| 3 | 1—2—1 (Fig. 4). |
| 4 | 1—3—3—1. |
| 5 | 1—4—6—4—1. |
| 6 | 1—5—10—10—5—1. |
| etc. | etc. |

The higher the number of dissipators, the broader will be the frequency characteristic; that is, the less sensitive the device will be to frequency deviations.

If the amount of attenuation obtained from the device described with respect to Figs. 1–6 is insufficient for any purpose, it will be clear that several devices of this type may be connected in cascade to obtain higher values of attenuation. Preferably such devices are connected so that their longitudinal centers of symmetry are separated by an odd number of quarter-wavelengths of the operating frequency to further reduce the effects of any undesired reflections.

Fig. 7 shows another type of concentric line attenuator. It is well known that an attenuator of the concentric line type may be formed by increasing the resistance per unit length of a concentric line. However, when such a device is connected to other high frequency apparatus, such as further concentric line sections, sources of high frequency energy, or high frequency utilization devices, undesirable reflections and impedance mismatch and variation occur. In order to avoid these undesirable effects, and in order to improve the frequency characteristics of such an attenuator, the device of Fig. 7 may be used.

In this case the attenuator is formed of an outer conductor 51 and an inner conductor 52 held concentrically in relation thereto by suitable insulating spacers 53. Inner conductor 52 is made of several sections. The outer sections 54 are preferably of highly conductive, low resistance material. Connected directly to the low resistance sections 54 are a pair of quarter-wave sections 56 and 57 having a higher resistance per unit length $R_1$, and between these two quarter-wave sections 56, 57 is a further half-wave section 58 having a resistance per unit length $R_2$. Preferably $R_2$ is selected to have a value twice that of $R_1$.

Figure 7A:
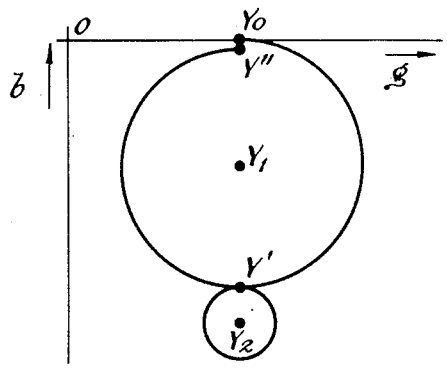
Fig. 7A shows an admittance diagram useful in explaining the theory of operation of the device of Fig. 7.

The operation of the device of Fig. 7 may be explained by reference to the admittance diagram of Fig. 7A, whose coordinate axes represent conductance $g$ and susceptance $b$, respectively. The characteristic admittance of the transmission line 51—52 or 51—54 may be represented by point $Y_0$. The characteristic admittance of the concentric line section 56—51 or 57—51 may be represented by point $Y_1$, since the appreciable resistance per unit length $R_1$ of the central conductor 56—57 of these sections produces effectively a capacitive susceptance component in its characteristic admittance. The characteristic admittance of line section 58—51 may be similarly represented by point $Y_2$, since the higher resistivity $R_2$ of this section produces a greater susceptive component for its characteristic admittance.

If the left end of the device of Fig. 7 is connected to an impedance matched thereto, it will be clear that looking leftward from each point of line 52—51 as the point of observation travels to the right, there will be seen the admittance $Y_0$ until the beginning of line section 56—51 is reached. Progressing to the right of the junction between lines 52—51 and 56—51, the resulting leftward admittance will progress in a curve about point $Y_1$, and in view of the quarter-wavelength of this section the terminating point Y' will be substantially in line with $Y_0$ and $Y_1$. This curve $Y_0$ Y' would be a true semicircle if the resistivity of line 56—51 was zero. However, due to the appreciable resistance per unit length of this line section 56—51 the curve will be approximately a spiral closing in toward $Y_1$. If the resistivity $R_2$ of section 58—51 is made substantially twice that of 56—51, point $Y_2$ will be displaced from the conductance axis $g$ by substantially twice the displacement of $Y_1$ and, accordingly, $Y_1$ will have a smaller susceptance component that will $Y_2$. The effect of adding the line section 58—51 to this admittance $Y_1$ as seen looking leftward from the junction between lines 56—51 and 58—51, is to cause the admittance locus to travel in substantially a closed curved path about point Y₂ as the point of observation travels along line 58—51 to the right extremity thereof. This curve about point Y₂ will be substantially a complete circle since the spiralling effect will be negligible for a curve of such small radius of curvature.

The additional quarter-wavelength line section 57—51 will transform the admittance Y' about a further spiral to a point Y'' at the end of section 57—51. It can be shown that by making R₁ and R₂ fairly small, (R₂ being twice R₁) point Y'' will be substantially identical with Y₀ so far as practical effects are concerned, and the connection of line 54—51 having this characteristic admittance Y₀ to line section 57—51 will produce a smooth transition without wave reflection, so that the characteristic impedance looking through the attenuator is not changed by the interposition of the attenuator. Furthermore, the use of the multiple sections having their respective resistivities per unit length related according to the binomial coefficients 1—2—1 produces an improvement in the frequency characteristic of the device, whereby a wider variation of frequency is permitted without materially effecting the matching of the attenuator to the rest of the circuit, similar to the device of Fig. 4.

For a further improvement in frequency characteristic, further sections of resistive concentric transmission line could be interposed in such manner that all sections are of a quarter-wavelength except the center section which would be of a half-wavelength, and the respective resistances per unit length of these sections would be related in accordance with the binomial coefficients obtained in a binomial expansion wherein the exponent of the expansion is equal to the number of resistive sections less one.

Figure 8:
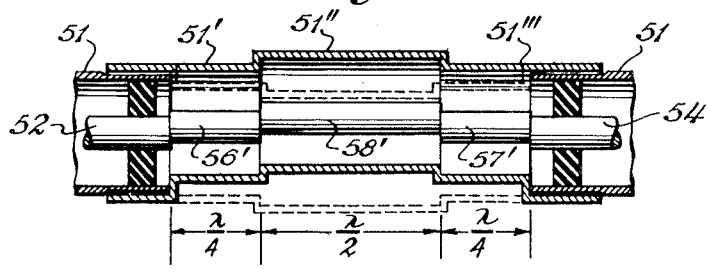
Fig. 8 shows a longitudinal cross-section of another concentric-line attenuator similar to that of Fig. 7, but including means for adjusting the value of attenuation produced.

Fig. 8 shows a modification of the device of Fig. 7 providing adjustability of the amount of attenuation produced while retaining fixed length, which is essential for permanently connecting the device into a system. Thus in Fig. 8 each of the sections 56—51, 58—51, and 57—51 of Fig. 7 is offset in steps from the main section 52—51, as shown by the sections 56'—51', 58'—51'', and 57'—51''' in Fig. 8. In addition, the outer conductive sections 51', 51'', 51''' are made integrally rotatable relative to the fixed outer conductor 51.

In the position shown in full lines in Fig. 8, each of these sections 56'—51', 58'—51'', and 57'—51''' forms a concentric transmission line section, and the attenuation produced by the device will be similar to that in Fig. 7, the off-setting of these quarter-wave spaced sections having substantially no effect. However, by rotating the adjustable outer conductor, an increase in attenuation can be produced up to a maximum in the position shown in dotted lines in Fig. 8.

This adjustable increase in attenuation is caused by the adjustable increase in the characteristic impedance of each of these line sections by virtue of the increasingly eccentric relation of the inner conductors to the outer conductors thereof. A further increase in attenuation is produced by the fact that the eccentric relationship of inner and outer conductors produces a non-uniform current distribution on these conductors leading to a still higher effective resistance per unit length for each of these resistance sections. By suitably adjusting the rotatable outer conductor, a continuously variable attenuation between the limits produced by the full line and dotted line position in Fig. 8 may be obtained.

It will be clear that each of the devices of the present invention will offer the same impedance when viewed in either direction, and hence are entirely bilateral in character.

As many changes could be made in the above construction and many apparently widely different embodiments of this invention could be made without departing from the scope thereof, it is intended that all matter contained in the above description and shown in the accompanying drawings shall be interpreted as illustrative and not in a limiting sense.

What is claimed is:

1. A high frequency attenuator comprising a pair of terminal concentric transmission line sections having separated coaxial inner conductors, a quarter-wavelength resistive inner conductor section connected to and off-set from each of said coaxial inner conductors, a further resistive half-wavelength inner conductor section joining said first resistive conductors and off-set with respect thereto, said half-wave conductor having a resistance per unit length twice that of each of said quarter-wave conductors, an outer conductor section cooperating with each of said inner conductor sections to form a transmission line section therewith, said outer conductor sections having off-set axes similar to the axes of the corresponding inner conductor sections, and means for rotating said outer conductor sections about the axis of said terminal inner conductors, whereby the attenuation introduced between said terminal sections may be adjusted by varying the eccentricity of said off-set inner conductor sections with respect to their respective outer conductors, substantially without altering the impedance offered by the device.

2. A high frequency attenuator comprising a pair of terminal concentric transmission line sections having separated coaxial inner conductors, a quarter-wavelength resistive inner conductor section connected to each of said coaxial inner conductors, a further resistive half-wavelength inner conductor section joining said first resistive conductors and having a resistance per unit length twice that of each of said quarter-wave conductors, and an outer conductor section cooperating with each of said inner conductor sections to form a concentric transmission line section therewith, whereby attenuation is introduced between said terminal sections substantially without altering the impedance viewed through said terminal sections.

3. A microwave frequency attenuator device comprising a transmission line characterized by inner and outer conductors, said inner conductor having two similar wave energy dissipative sections extending therealong of the order of one-quarter wavelength and a central dissipation section extending between said first-mentioned sections of the order one-half wavelength, the resistance per unit length of said first-mentioned sections being of the order one-half the value of the resistance per unit length of said central section, and the summation of the complex impedances of said transmission line having said dissipative sections being characterized to effect cancellation of wave energy reflections caused by the presence of said dissipative sections.

4. A microwave frequency attenuator device comprising a transmission line characterized by inner and outer conductors, said inner conductor having wave energy dissipative sections extending therealong a distance electrically equivalent of at least one-quarter wavelength and a central dissipative section extending between said first-mentioned sections a distance electrically equivalent of at least one-half wavelength, the resistance per unit length of said first-mentioned sections being relatively smaller than the resistance per unit length of said central dissipative section, and the summation of the complex impedances of transmission line having said dissipative sections being characterized to effect cancellation of wave energy reflections.

5. A microwave frequency attenuator device as defined in claim 4 wherein the resistance per unit length of said first-mentioned sections are of the order of one-half the resistance per unit length of said central section.

6. A microwave frequency attenuator device comprising a transmission line characterized by inner and outer conductors, said inner conductor having two wave energy dissipative sections extending therealong a distance electrically equivalent to one-quarter wavelength and a central wave energy dissipative section extending between said first-mentioned sections a distance electrically equivalent to one-half wavelength, the resistance per unit length of said quarter wavelength sections being equal and having a value substantially one-half the resistance per unit length of said central section, and the summation of the complex impedances of said transmission line having said dissipative sections being characterized to effect cancellation of wave energy reflections caused by the presence of said dissipative sections.

7. An attenuator for high frequency electromagnetic energy comprising a coaxial line section having an inner conductor divided into a plurality of sections, the resistivities of the successive sections of said inner conductor being related to one another substantially in accordance with the coefficients obtained in a binomial expansion wherein the exponent of the expansion is equal to one less than the number of said sections.

8. The apparatus of claim 7, wherein there are an odd number of sections and the center section has a length substantially equal to an integral number of one-half wavelengths and the other sections have a length substantially equal to an odd number of one-quarter wavelengths at the operating frequency.

9. The apparatus of claim 8, wherein the axes of said sections of the inner conductor are transversely offset from one another and the axes of the corresponding portions of the outer conductor are transversely offset from one another substantially the same amount as the axes of the corresponding sections of the inner conductor, and means for rotating said corresponding portions of the outer conductor about the axes of said offset sections of the inner conductor.

10. An attenuator for high frequency electromagnetic energy comprising a two-conductor transmission line section having one conductor thereof divided into sections, the resistivities of the conductors of the successive sections being related to one another substantially in accordance with the coefficients obtained in a binomial expansion wherein the exponent of the expansion is equal to one less than the number of said sections.

11. The apparatus of claim 10, wherein there are an odd number of sections and the center section has a length substantially equal to one-half wavelength and the other sections have a length substantially equal to one-quarter wavelength at the operating frequency.

12. An attenuator for high frequency electromagnetic energy comprising a coaxial line section having an inner conductor divided into three sections wherein the resistivities of the conductors of the two end sections are substantially equal and are substantially one-half the resistivity of the conductor of the center section, and the lengths of the conductors of the two end sections are substantially equal to one-quarter wavelength and the length of the conductor of the center section is substantially equal to one-half wavelength at the operating frequency.

BETSY R. HANSEN,
*Executrix of the Last Will and Testament of William W. Hansen.*

REFERENCES CITED

The following references are of record in the file of this patent:

UNITED STATES PATENTS

| Number | Name | Date |
| --- | --- | --- |
| 2,151,157 | Schelkunoff | Mar. 21, 1939 |
| 2,433,368 | Johnson et al. | Dec. 30, 1947 |